US012442907B2

(12) United States Patent
Takasuka et al.

(10) Patent No.: US 12,442,907 B2
(45) Date of Patent: Oct. 14, 2025

(54) DISTANCE ESTIMATION DEVICE AND DISTANCE ESTIMATION SYSTEM

(71) Applicant: DENSO CORPORATION, Kariya (JP)

(72) Inventors: Naohito Takasuka, Nisshin (JP); Youichiro Suzuki, Nisshin (JP); Kenichirou Sanji, Kariya (JP)

(73) Assignee: DENSO CORPORATION, Kariya (JP)

( * ) Notice: Subject to any disclaimer, the term of this patent is extended or adjusted under 35 U.S.C. 154(b) by 359 days.

(21) Appl. No.: 18/069,291

(22) Filed: Dec. 21, 2022

(65) Prior Publication Data

US 2023/0117249 A1  Apr. 20, 2023

Related U.S. Application Data

(63) Continuation of application No. PCT/JP2021/019469, filed on May 21, 2021.

(30) Foreign Application Priority Data

Jun. 26, 2020  (JP) .................................. 2020-110669

(51) Int. Cl.
*G01S 11/08* (2006.01)
*B60R 25/24* (2013.01)

(52) U.S. Cl.
CPC .............. *G01S 11/08* (2013.01); *B60R 25/24* (2013.01)

(58) Field of Classification Search
CPC .................................. G01S 11/08; B60R 25/24
USPC ..................................................... 340/426.36
See application file for complete search history.

(56) References Cited

U.S. PATENT DOCUMENTS

| 8,965,599 | B2* | 2/2015 | Hawes | G07C 9/00309 |
| | | | | 340/901 |
| 9,536,364 | B2* | 1/2017 | Talty | E05B 19/0082 |
| 9,858,735 | B2* | 1/2018 | Spahl | H04W 52/02 |
| 10,328,898 | B2* | 6/2019 | Golsch | B60R 25/20 |
| 10,647,296 | B2* | 5/2020 | Golsch | B60R 25/2018 |
| 10,775,480 | B2* | 9/2020 | Kong | G01S 5/14 |
| 11,462,064 | B2* | 10/2022 | Nonin | G01S 13/88 |
| 2013/0069760 | A1* | 3/2013 | Lickfelt | H04B 17/29 |
| | | | | 455/67.11 |

(Continued)

FOREIGN PATENT DOCUMENTS

| JP | 2018-85510 A | 5/2018 |
| JP | 2019-191049 A | 10/2019 |

*Primary Examiner* — Zhen Y Wu
(74) *Attorney, Agent, or Firm* — Harness, Dickey & Pierce, P.L.C.

(57) ABSTRACT

A distance estimation device includes a mobile terminal transmitting a radio wave and an in-vehicle device. The in-vehicle device includes a direction determination unit having a receiver, a distance measurement unit, and a correction unit. The receiver receives the radio wave and is arranged on a side of the vehicle. The direction determination unit determines a direction from which the radio wave comes based on a signal strength of the received radio wave. The distance measurement unit receives the radio wave and measures a distance from an installation position of the distance measurement unit to the mobile terminal based on information other than a signal strength of the received radio wave. The correction unit corrects the measured distance to be a distance from an edge of the vehicle to the mobile terminal based on the determined direction and the installation position.

6 Claims, 14 Drawing Sheets

(56) References Cited

U.S. PATENT DOCUMENTS

| | | | |
|---|---|---|---|
| 2015/0208207 A1* | 7/2015 | Ye | H04W 4/023 |
| | | | 455/456.1 |
| 2016/0063786 A1* | 3/2016 | Lewis | B60R 25/24 |
| | | | 340/5.72 |
| 2018/0099643 A1* | 4/2018 | Golsch | G01S 13/765 |
| 2019/0137617 A1* | 5/2019 | Chapuis | G01S 11/00 |
| 2019/0263356 A1* | 8/2019 | Golsch | G01S 13/765 |
| 2020/0217947 A1* | 7/2020 | Stitt | B60R 25/209 |
| 2020/0346618 A1* | 11/2020 | Steegmann | B60R 25/245 |
| 2021/0078537 A1* | 3/2021 | Ootaka | G01S 13/103 |
| 2022/0001836 A1* | 1/2022 | Baek | G01S 13/878 |

* cited by examiner

DISTANCE ESTIMATION DEVICE AND DISTANCE ESTIMATION SYSTEM

CROSS REFERENCE TO RELATED APPLICATIONS

The present application is a continuation application of International Patent Application No. PCT/JP2021/019469 filed on May 21, 2021, which designated the U.S. and claims the benefit of priority from Japanese Patent Application No. 2020-110669 filed on Jun. 26, 2020. The entire disclosures of all of the above applications are incorporated herein by reference.

TECHNICAL FIELD

The disclosure in this specification relates to a distance estimation device that estimates a distance from a mobile terminal to a vehicle.

BACKGROUND

A distance measuring device measures a distance from a vehicle to an electronic key using propagation time of a radio wave.

SUMMARY

According to at least one embodiment, a distance estimation device is a distance estimation device estimating a distance from a mobile terminal to a vehicle. The distance estimation device includes the mobile terminal and an in-vehicle device provided in the vehicle. The mobile terminal includes a terminal transmitter configured to transmit a radio wave to the vehicle and a terminal controller configured to control the terminal transmitter. The in-vehicle device includes a direction determination unit provided in the vehicle, a distance measurement unit, and a correction unit. The direction determination unit includes a receiver receiving the radio wave from the mobile terminal. The receiver is arranged on a side of the vehicle associated with a direction from which the radio wave transmitted by the mobile terminal comes. The direction determination unit determines the direction from which the radio wave transmitted by the mobile terminal comes based on a strength of a reception signal received by the receiver from the mobile terminal. The distance measurement unit receives the radio wave from the mobile terminal and measures a distance from an installation position of the distance measurement unit to the mobile terminal based on information other than a strength of a reception signal of the received radio wave. The correction unit corrects the distance measured by the distance measurement unit to be a distance from an edge of the vehicle to the mobile terminal based on the direction determined by the direction determination unit and the installation position of the distance measurement unit.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
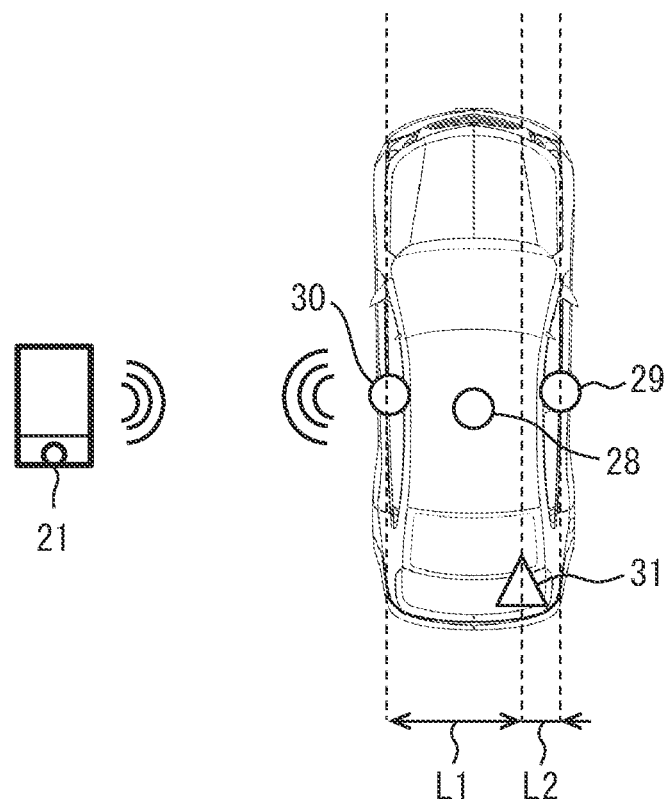
FIG. 1 is a diagram illustrating an electronic key position estimation system.

To begin with, examples of relevant techniques will be described.

A distance measuring device according to a comparative example transmits and receives a radio wave between a vehicle and an electronic key, and then obtains a distance from the vehicle to the electronic key using propagation time of the radio wave.

Although the distance measuring device obtains a distance between an antenna that is installed in the vehicle and transmits the radio wave and the electronic key, a distance from an edge of the vehicle to the electronic key is unknown.

In contrast to the comparative example, according to a distance estimation device of the present disclosure, a distance from an edge of a vehicle to a mobile terminal can be estimated.

According to one aspect of the present disclosure, a distance estimation device is a distance estimation device estimating a distance from a mobile terminal to a vehicle. The distance estimation device includes the mobile terminal and an in-vehicle device provided in the vehicle. The mobile terminal includes a terminal transmitter configured to transmit a radio wave to the vehicle and a terminal controller configured to control the terminal transmitter. The in-vehicle device includes a direction determination unit provided in the vehicle, a distance measurement unit, and a correction unit. The direction determination unit includes a receiver receiving the radio wave from the mobile terminal. The receiver is arranged on a side of the vehicle associated with a direction from which the radio wave transmitted by the mobile terminal comes. The direction determination unit determines the direction from which the radio wave transmitted by the mobile terminal comes based on a strength of a reception signal received by the receiver from the mobile terminal. The distance measurement unit receives the radio wave from the mobile terminal and measures a distance from an installation position of the distance measurement unit to the mobile terminal based on information other than a strength of a reception signal of the received radio wave. The correction unit corrects the distance measured by the distance measurement unit to be a distance from an edge of the vehicle to the mobile terminal based on the direction determined by the direction determination unit and the installation position of the distance measurement unit.

According to the distance estimation device, the direction determination unit determines a direction from which the radio wave transmitted by the mobile terminal comes. The distance measurement unit measures the distance from the installation position of the distance measurement unit to the mobile terminal based on the information other than the strength of the reception signal. Since the distance measurement unit measures the distance based on the information other than the strength of the reception signal, the distance measurement unit is capable of maintaining a distance measurement accuracy even if the strength of the reception signal is improperly amplified by another device. The correction unit corrects the distance from the distance measurement unit to the mobile terminal measured by the distance measurement unit based on the direction determined by the direction determination unit and the installation position. As a result, the distance estimation device is capable of measuring the distance from an edge of the vehicle to the mobile terminal regardless of the installation position of the distance measurement unit.

The following describes embodiments for carrying out the present disclosure with reference to the drawings. In each embodiment, a part corresponding to the part described in the preceding embodiment may be denoted by the same reference numeral or a reference numeral with one character added to a preceding reference numeral; thereby, redundant explanation may be omitted. In each embodiment, when only part of the configuration is described, the other part of the configuration can be the same as that in a preceding embodiment. The present disclosure is not limited to combinations of embodiments which combine parts that are explicitly described as being combinable. As long as no problems are present, the various embodiments may be partially combined with each other even if not explicitly described.

First Embodiment

Hereinafter, a first embodiment of the present disclosure will be described with reference to FIGS. 1 to 8. As shown FIG. 1, an electronic key position estimation system corresponding to a distance estimation system has a function of causing an ECU to verify an electronic key 21 based on wireless communication between an in-vehicle device 20 and the electronic key 21, and a function of performing or permitting execution of the predetermined process when the verification is successful. The in-vehicle device 20 is provided in the vehicle 100. The electronic key 21 is a mobile terminal. The ECU is an abbreviation for "Electronic Control Unit", that is, an abbreviation for an electronic control device.

The verification of the electronic key 21 is to confirm whether the electronic key 21 is a correct electronic key associated with the in-vehicle device 20 in advance. For example, the verification is executed as follows. An authentication ECU 22 of the in-vehicle device 20 controls a LF antenna 23 (i.e., low frequency antenna), which is an in-vehicle antenna, to transmit a request signal.

Upon receiving the request signal, the electronic key 21 transmits a response signal including a unique ID (i.e., identification). When the in-vehicle device 20 receives the response signal through a RF antenna 24 (i.e., radio frequency antenna), the authentication ECU 22 verifies the electronic key 21 by verifying the ID included in the response signal.

Examples of the predetermined process to be executed or permitted to be executed when the verification of the electronic key 21 is successful will be described. A start of a vehicle engine is permitted when the correct electronic key 21 is positioned in a vehicle compartment of the vehicle 100. In addition, unlocking of a vehicle door is permitted when the correct electronic key 21 is positioned in a predetermined region outside the vehicle. A welcome process for turning on a hazard lamp of the vehicle 100 or the like is executed when the correct electronic key 21 approaches the vehicle 100 by a predetermined distance. Therefore, the electronic key position estimation system permits or performs execution of different processes depending on a position of the electronic key 21 relative to the vehicle 100.

The electronic key position estimation system estimates the position of the electronic key 21 relative to the vehicle 100 when executing or permitting the predetermined process to be executed by the verification. Hereinafter, a configuration of the electronic key position estimation system for estimating the position of the electronic key 21 relative to the vehicle 100 will be described. Therefore, the electronic key position estimation system functions as a distance estimation device that estimates a distance between the electronic key 21 and the vehicle 100.

As shown in FIG. 1, the electronic key position estimation system includes the in-vehicle device 20 and the electronic key 21. The in-vehicle device 20 is provided in the vehicle 100, and the electronic key 21 is carried by a user.

Figure 2:
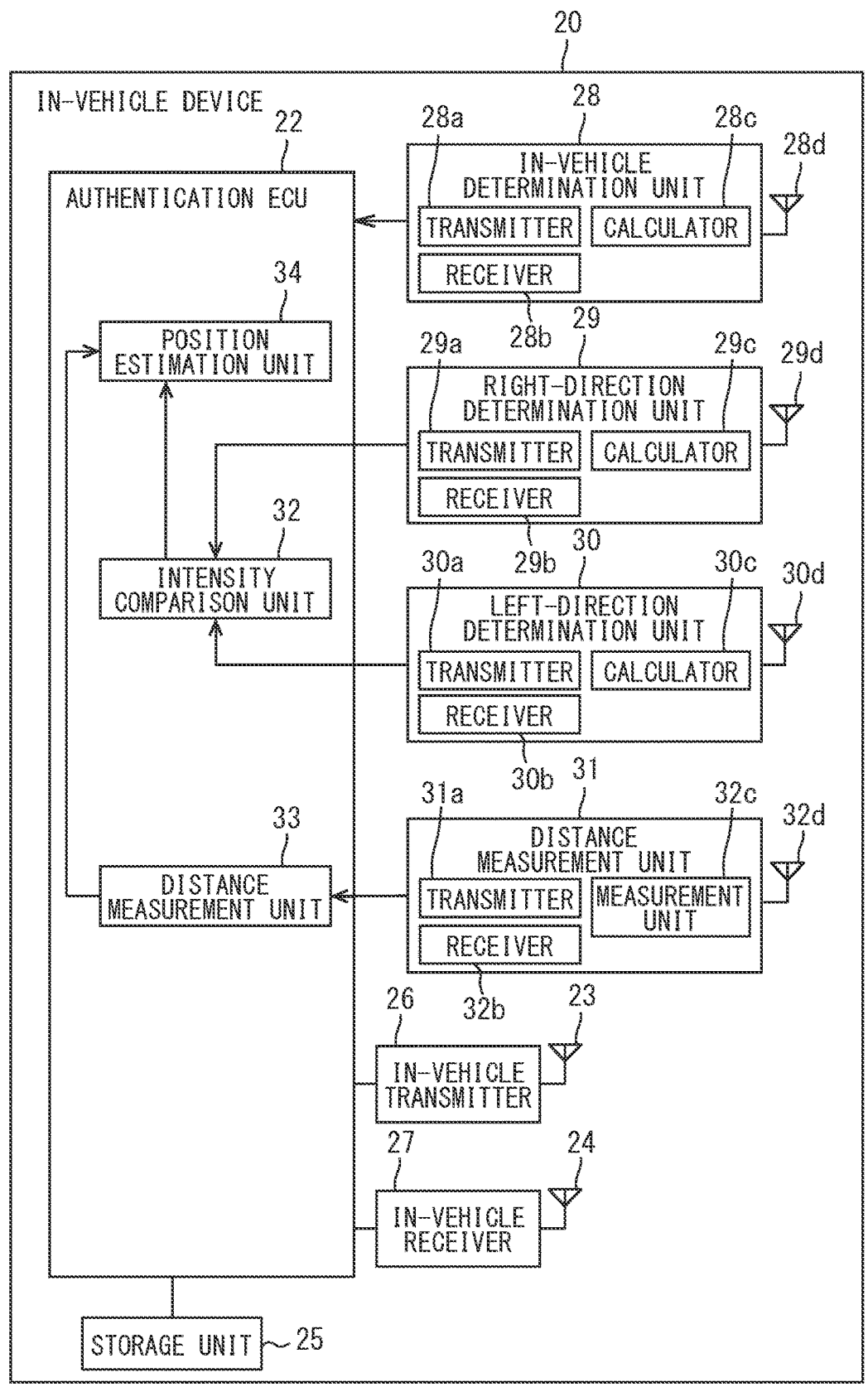
FIG. 2 is a block diagram illustrating an in-vehicle device.

Next, the in-vehicle device 20 will be described with reference to FIG. 2. The in-vehicle device 20 includes the authentication ECU 22, a storage unit 25, an in-vehicle transmitter 26, the LF antenna 23, an in-vehicle receiver 27 and the RF antenna 24. Further, the in-vehicle device 20 includes an in-vehicle determination unit 28, a right-direction determination unit 29, a left-direction determination unit 30 and a distance measurement unit 31.

The authentication ECU 22 mainly includes a microcomputer. For example, a processor such as a calculation processing device (i.e., CPU) executes a program stored in a storage device such as a read only memory (i.e., ROM), and thereby the authentication ECU 22 executes various processes including verification of the electronic key 21 and position estimation of the electronic key 21 in cooperation with the electronic key 21. At least a part of functions of the authentication ECU 22 may be provided by a dedicated integrated circuit (i.e., IC) or the like. The storage unit 25 has a non-volatile memory and stores various programs.

The in-vehicle transmitter 26 modulates or amplifies a vehicle signal of a VLF wave or a LF wave under control of the authentication ECU 22, and causes the LF antenna 23 to transmit the vehicle signal as a radio wave. LF is an abbreviation for Low Frequency, and VLF is an abbreviation for Very Low Frequency. In the present disclosure, the LF may include the VLF. When the request signal is transmitted as the vehicle signal, information requesting the electronic key 21 to return the response signal including the unique ID is included. The LF antenna 23 is provided, for example, in the vehicle compartment.

The in-vehicle receiver 27 receives a key signal transmitted from the electronic key 21 as a RF (Radio Frequency) wave via the RF antenna 24. The in-vehicle receiver 27 amplifies an electric signal acquired from the RF antenna 24, demodulates the key signal from the electric signal, and outputs the key signal to the authentication ECU 22. The RF antenna 24 is provided, for example, in the vehicle compartment.

The key signal including the unique ID transmitted from the electronic key 21 as the response to the request signal is a response signal. The key signal may further include RSSI information indicating a strength of reception signal at the time when the electronic key 21 receives the vehicle signal. The strength of reception signal may be hereinafter referred to as "RSSI".

The in-vehicle determination unit 28 cooperates with the authentication ECU 22, the in-vehicle determination unit 28 receive the radio wave from the electronic key 21 and use the RSSI of the received radio wave to determine whether the electronic key 21 is in the vehicle compartment. The in-vehicle determination unit 28 includes a first transmitter 28a, a first receiver 28b, a first calculator 28c, and a first antenna 28d. The first transmitter 28a modulates or amplifies the vehicle signal of the VLF wave or the LF wave under control of the authentication ECU 22, and causes the first antenna 28d to transmit the vehicle signal as the radio wave. The first receiver 28b receives a key signal transmitted from the electronic key 21 as a RF wave via the first antenna 28d. The first receiver 28b amplifies the electric signal acquired from the first antenna 28d, demodulates the key signal from the electric signal, and outputs the key signal.

The in-vehicle determination unit 28 has already executed a key exchange protocol (known as pairing) with the electronic key 21. Terminal information about the electronic key 21 acquired by pairing is stored in the non-volatile memory included in the in-vehicle determination unit 28. The terminal information is, for example, key information exchanged by pairing.

The first calculator 28c requests pairing with the electronic key 21 via the first transmitter 28a, and authenticates whether pairing is possible using a response signal received by the first receiver 28b. After the pairing, the first calculator 28c requests the electronic key 21 to transmit the radio wave via the first transmitter 28a, and detects the RSSI of the radio wave received by the first receiver 28b. The first calculator 28c outputs the detected RSSI to the authentication ECU 22.

The authentication ECU 22 uses the RSSI output by the in-vehicle determination unit 28 to determine whether the electronic key 21 is in the vehicle compartment. It has been known that a RSSI decreases as a communication distance increases. A relationship between the RSSI and the communication distance is decided based on an experiment, and is stored in the storage unit 25. Therefore, if the RSSI is known, the distance between the first antenna 28d and the electronic key 21 can be estimated. The authentication ECU 22 determines whether the electronic key 21 is in the vehicle compartment based on the RSSI.

The right-direction determination unit 29 and the left-direction determination unit 30 cooperate with the authentication ECU 22, receive the radio wave from the electronic key 21 and use the RSSI of the received radio wave to determine a direction from the vehicle toward a position of the electronic key 21. Therefore, the right-direction determination unit 29 and the left-direction determination unit 30 function as a direction determination unit. The right-direction determination unit 29 and the left-direction determination unit 30 are arranged on a side of the vehicle 100 associated with a direction from which the radio wave transmitted by the electronic key 21 comes. The direction from which the radio wave transmitted by the electronic key 21 comes is a direction from a position of the electronic key 21 to the vehicle 100 when the vehicle 100 is viewed in the vertical direction. More specifically, the authentication ECU 22, the right-direction determination unit 29 and the left-direction determination unit 30 cooperate, receive the radio wave from the electronic key 21 and determine the direction based on whether the radio wave is transmitted from a right of the vehicle 100 or a left of the vehicle 100 based on the RSSI received.

The left-direction determination unit 30 is provided on the left side of the vehicle 100, and the right-direction determination unit 29 is provided on the right side of vehicle 100. Next, the right-direction determination unit 29 will be described. The right-direction determination unit 29 receives the radio wave from the electronic key 21 and outputs the RSSI of the received radio wave. The right-direction determination unit 29 includes a second transmitter 29a, a second receiver 29b, a second calculator 29c, and a second antenna 29d. The second transmitter 29a modulates or amplifies the vehicle signal of the VLF wave or the LF wave under control of the authentication ECU 22, and causes the second antenna 29d to transmit the vehicle signal as the radio wave. The second receiver 29b receives the key signal transmitted from the electronic key 21 as the RF wave via the second antenna 29d. The second receiver 29b amplifies the electric signal acquired from the second antenna 29d, demodulates the key signal from the electric signal, and outputs the key signal.

The right-direction determination unit 29 has already executed the key exchange protocol (known as pairing) with the electronic key 21. The terminal information about the electronic key 21 acquired by pairing is stored in the non-volatile memory included in the right-direction determination unit 29.

The second calculator 29c requests pairing with the electronic key 21 via the second transmitter 29a, and authenticates whether pairing is possible using the response signal received by the second receiver 29b. After the pairing, the second calculator 29c requests the electronic key 21 to transmit the radio wave via the second transmitter 29a, and detects the RSSI of the radio wave received by the second receiver 29b. The second calculator 29c outputs the detected RSSI to the authentication ECU 22.

The left-direction determination unit 30 receives the radio wave from the electronic key 21 and outputs the RSSI of the received radio wave. The left-direction determination unit 30 includes a third transmitter 30a, a third receiver 30b, a third calculator 30c, and a third antenna 30d. The third transmitter 30a modulates or amplifies the vehicle signal of the VLF wave or the LF wave under control of the authentication ECU 22, and causes the third antenna 30d to transmit the vehicle signal as the radio wave. The third receiver 30b receives the key signal transmitted from the electronic key 21 as the RF wave via the third antenna 30d. The third receiver 30b amplifies the electric signal acquired from the third antenna 30d, demodulates the key signal from the electric signal, and outputs the key signal.

The left-direction determination unit 30 has already executed the key exchange protocol (known as pairing) with the electronic key 21. The terminal information about the electronic key 21 acquired by pairing is stored in the non-volatile memory included in the left-direction determination unit 30.

The third calculator 30c requests pairing with the electronic key 21 via the third transmitter 30a, and authenticates whether pairing is possible using the response signal received by the third receiver 30b. After the pairing, the third calculator 30c requests the electronic key 21 to transmit the radio wave via the third transmitter 30a, and detects the RSSI of the radio wave received by the third receiver 30b. The third calculator 30c outputs the detected RSSI to the authentication ECU 22.

The authentication ECU 22 includes an intensity comparison unit 32 as a functional block. The intensity comparison unit 32 determines the direction by comparing the RSSIs output by the left-direction determination unit 30 and the right-direction determination unit 29. When the RSSI received by the second receiver 29b is greater than the RSSI received by the third receiver 30b, the intensity comparison unit 32 determines that the radio wave comes form the right of the vehicle, and when the RSSI received by the third receiver 30b is greater than the RSSI received by the second receiver 29b, the intensity comparison unit 32 determines that the radio wave comes from the left of the vehicle. Therefore, the intensity comparison unit 32 functions as a determiner.

The distance measurement unit 31 receives the radio wave from the electronic key 21 and measures a distance from an installation position of the distance measurement unit 31 in the vehicle 100 to the electronic key 21 based on information other than the RSSI of the received radio wave. More specifically, the distance measurement unit 31 receives the radio wave from the electronic key 21 and measures a distance from the installation position in the vehicle 100 to the electronic key 21 based on an arrival time of the radio wave from the electronic key 21. The distance measurement unit 31 includes a fourth transmitter 31a, a fourth receiver 31b, a measurement unit 31c, and a fourth antenna 31d. The fourth transmitter 31a modulates or amplifies the vehicle signal of the VLF wave or the LF wave under control of the authentication ECU 22, and causes the fourth antenna 31d to transmit the vehicle signal as the radio wave. The fourth receiver 31b receives the key signal transmitted from the electronic key 21 as the RF wave via the fourth antenna 31d. The fourth receiver 31b amplifies the electric signal acquired from the fourth antenna 31d, demodulates the key signal from the electric signal, and outputs the key signal.

The distance measurement unit 31 has already executed the key exchange protocol (known as pairing) with the electronic key 21. The terminal information about the electronic key 21 acquired by pairing is stored in the non-volatile memory included in the distance measurement unit 31.

The measurement unit 31c requests pairing with the electronic key 21 via the fourth transmitter 31a, and authenticates whether pairing is possible using the response signal received by the fourth receiver 31b. After the pairing, the measurement unit 31c requests the electronic key 21 to transmit the radio wave via the fourth transmitter 31a, and measures a time from when the request is made to when the fourth receiver 31b receives the radio wave. The measurement unit 31c outputs the measured arrival time to the authentication ECU 22.

The authentication ECU 22 includes a distance estimation unit 33 as a functional block. The distance estimation unit 33 estimates a distance from the fourth antenna 31d to the electronic key 21 based on the arrival time output from the distance measurement unit 31. The distance estimation unit 33 outputs the estimated distance.

The installation position of the distance measurement unit 31 is a predetermined position in the vehicle 100 and is a rear right as shown in FIG. 1 in the present embodiment. Information on the installation position of the distance measurement unit 31 includes information indicating a distance L1 from a position of a left door handle of the vehicle 100 to the fourth antenna 31d of the distance measurement unit 31 in a left-right direction of the vehicle 100. The distance L1 may hereinafter be referred to as a "left offset amount". Information on the installation position of the distance measurement unit 31 also includes information indicating a distance L2 from a position of a right door handle of the vehicle 100 to the fourth antenna 31d in the left-right direction. The distance L2 may hereinafter be referred to as a "right offset amount".

The authentication ECU 22 includes a position estimation unit 34 as a functional block. The position estimation unit 34 estimates a position of electronic key 21 based on the estimated distance output by distance estimation unit 33, the direction output by intensity comparison unit 32, and the installation position of the distance measurement unit 31. The position estimation unit 34 estimates the position of the electronic key 21 as a distance from a door handle. More specifically, the position estimation unit 34 corrects the distance measured by the distance measurement unit 31 to be the distance from an edge of the vehicle 100 to the electronic key 21 based on the determined direction and the installation position of the distance measurement unit 31. Therefore, the position estimation unit 34 functions as a correction unit. When the determined direction is from the right of the vehicle, the position estimation unit 34 corrects the distance measured by the distance estimation unit 33 based on the right offset amount L2 from the right edge of the vehicle 100 to the installation position, and when the determined direction is from the left of the vehicle, the position estimation unit 34 corrects the distance measured by the distance estimation unit 33 based on the left offset amount L1 from the left edge of the vehicle 100 to the installation position.

Figure 3:
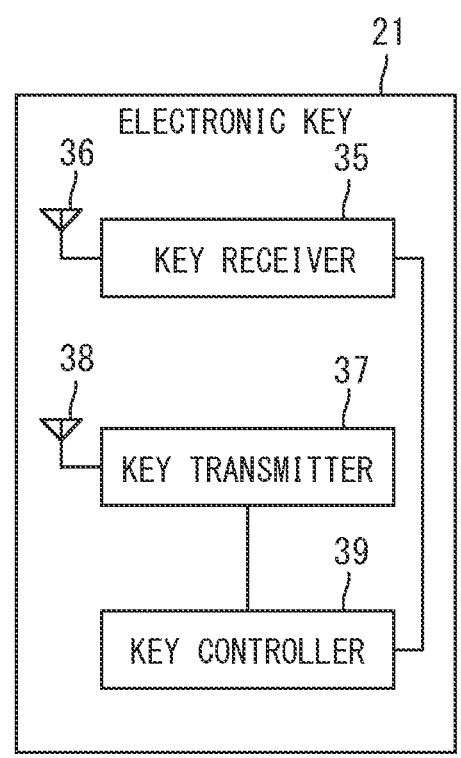
FIG. 3 is a block diagram illustrating an electronic key.

Next, the electronic key 21 will be described with reference to FIG. 3. The electronic key 21 includes a key receiver 35, a key reception antenna 36, a key transmitter 37, a key transmission antenna 38 and a key controller 39.

The key receiver 35 acquires the electric signal indicating the radio wave transmitted from the LF antenna 23 via the key reception antenna 36. The key receiver 35 demodulates and amplifies the electric signal, extracts the vehicle signal, and output the vehicle signal to the key controller 39.

The key transmitter 37 modulates and amplifies the key signal with the RF wave under control of the key controller 39, and transmits the key signal from the key transmission antenna 38. The key signal is generated by the key controller 39. The key signal contains the unique ID of the electronic key 21. Therefore, the key transmitter 37 and the key transmission antenna 38 function as a terminal transmitter that transmits the radio wave to the vehicle 100.

The key controller 39 mainly includes the microcomputer. The key controller 39 functions as a terminal controller that controls each section. For example, the key controller 39 has a function of executing various processes including the verification of the electronic key 21 and a position estimation of the electronic key 21 in cooperation with the in-vehicle device 20 by causing the processer such as the CPU to execute the program stored in a storage device such as the ROM. The position estimation will be described later. At least a part of the functions of the key controller 39 may be provided by a dedicated IC or the like.

Figure 4:
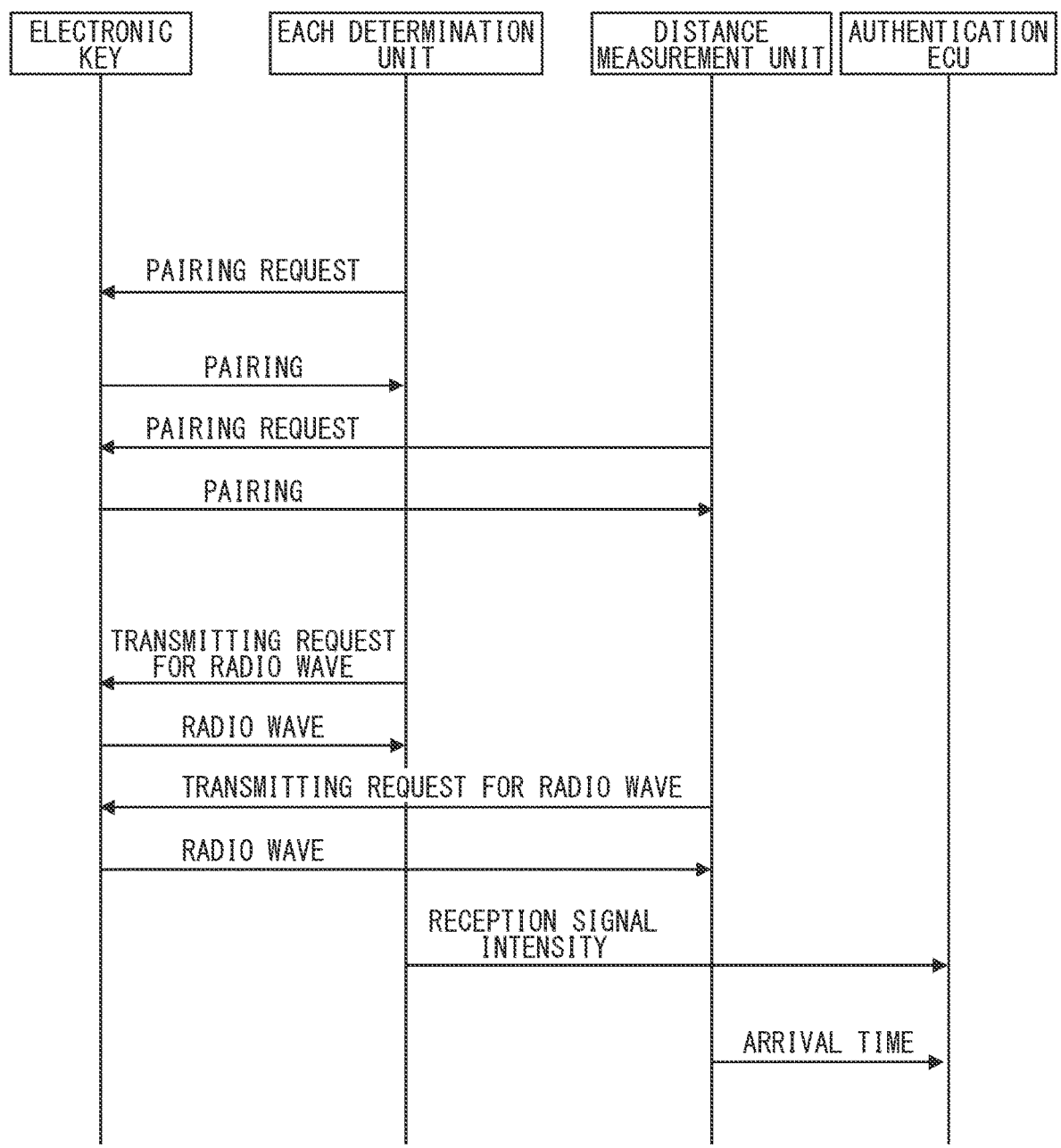
FIG. 4 is a diagram illustrating a communication procedure.

Next, an operation flow of the electronic key 21 and each part will be described with reference to FIG. 4. In FIG. 4, each determination unit means each of the units: the in-vehicle determination unit 28; the left-direction determination unit 30; and the right-direction determination unit 29. Since an operation flow in FIG. 4 is the same for each of these three determination units, they are shown in such a shared manner.

As shown in FIG. 4, when starting communication, each determination unit and distance measurement unit 31 on the vehicle 100 first transmit a pairing request to the electronic key 21. Then, the electronic key 21 receives the pairing request, and if the pairing has already been executed in advance, the pairing is allowed and the pairing is established.

When the pairing is established, each determination unit requests the electronic key 21 to transmit the radio wave. Then, the electronic key 21 transmits the radio wave to each determination unit. Upon receiving the radio wave from the electronic key 21, each determination unit detects the RSSI and outputs the RSSI to the authentication ECU 22.

When the pairing is established, the distance measurement unit 31 requests the electronic key 21 to transmit the radio wave. Then, the electronic key 21 transmits the radio wave to the distance measurement unit 31. At this time, time information indicating a transmission time is included. Upon receiving the radio wave from the electronic key 21, the distance measurement unit 31 calculates the arrival time based on the transmission time and a received time and outputs the arrival time to the authentication ECU 22.

Figure 5:
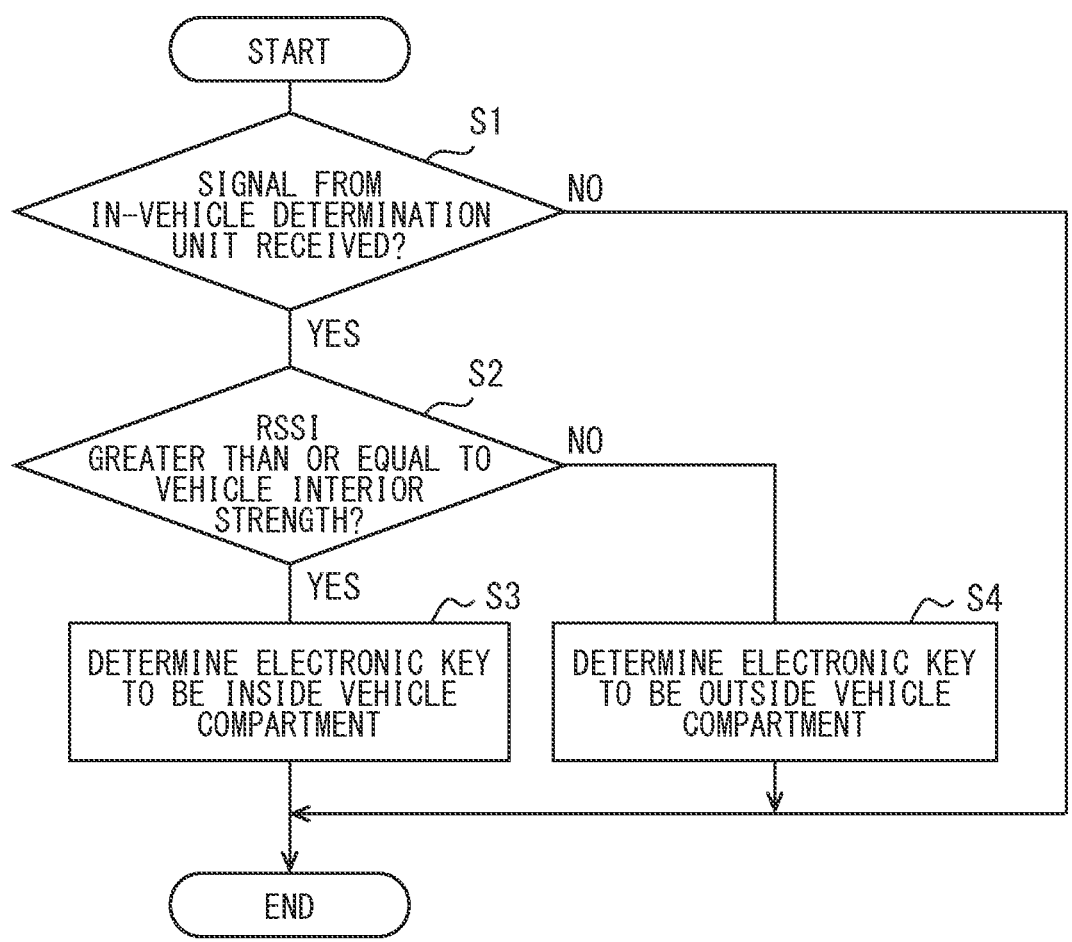
FIG. 5 is a flowchart illustrating for determining whether the electronic key is in a vehicle compartment.

Next, a processing of the authentication ECU 22 will be described with reference to a flowchart. FIG. 5 is a flowchart illustrating a processing in the authentication ECU 22 related to determination whether the electronic key 21 is in the vehicle compartment. The process described in FIG. 5 is repeatedly executed in a short cycle by the authentication ECU 22.

In step S1, it is determined whether a signal from the in-vehicle determination unit 28 has been received. When the signal has been received, an operation in step S2 is executed, and when the signal has not been received, the process terminates. In step S2, it is determined whether the RSSI is greater than or equal to a vehicle interior strength. When the RSSI is greater than or equal to the vehicle interior strength, the process proceeds to step S3, and when the RSSI is not greater than and not equal to the vehicle interior strength, the process proceeds to step S4. The vehicle interior strength is a set value that is set in advance based on the relationship between the RSSI and the communication distance.

In step S3, it is determined that the electronic key 21 is in the vehicle compartment, and the process terminates. In step S4, it is determined that the electronic key 21 is located outside the vehicle compartment, and the process terminates.

Figure 6:
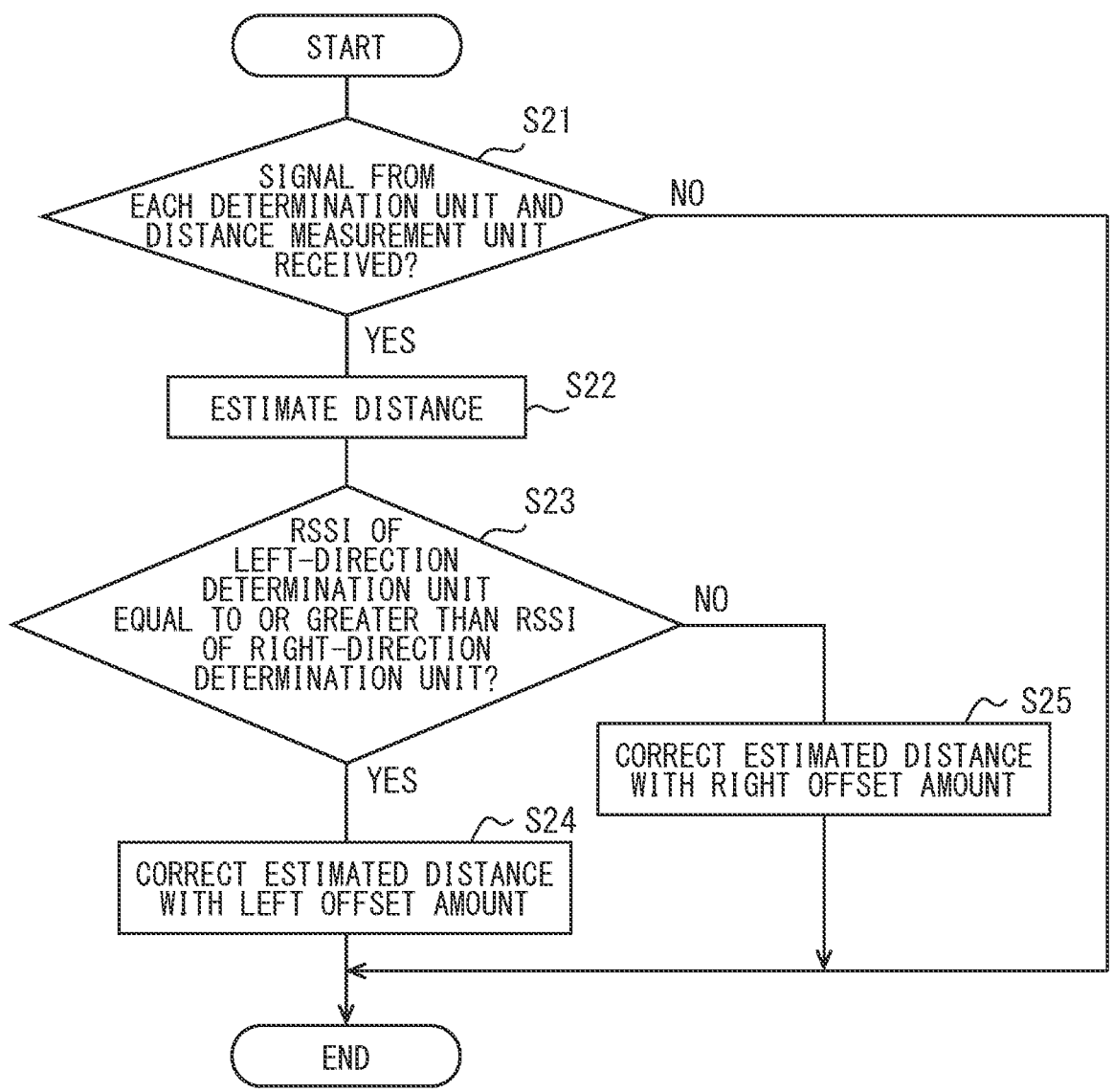
FIG. 6 is a flowchart illustrating for estimating a distance.
Figure 7:
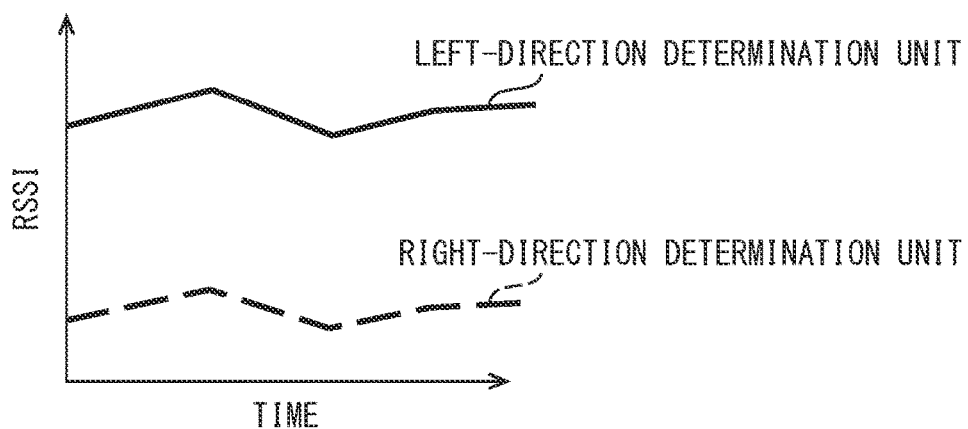
FIG. 7 is a graph illustrating a relationship between RSSI and time.

Next, a processing for determining the direction and correcting the distance will be described with reference to FIGS. 6 to 8. FIG. 6 is a flowchart illustrating a process in the authentication ECU 22 related to determination of the direction. The process described in FIG. 6 is repeatedly executed in a short cycle by the authentication ECU 22. Furthermore, the process described in FIG. 6 is executed when it is determined that the electronic key 21 is located outside the vehicle compartment in the control flow in FIG. 5. Therefore, the process described in FIG. 6 is not executed when the electronic key 21 is in the vehicle compartment.

In step S21, it is determined whether a signal from each direction determination unit and the distance measurement unit 31 has been received. When the signal has been received, an operation of step S22 is executed, and when the signal has not been received, the process terminates. Each direction determination unit is a generic term that indicates both the left-direction determination unit 30 and the right-direction determination unit 29.

In step S22, the distance estimation unit 33 estimates the distance, and the process proceeds to step S23. In step S23, the intensity comparison unit 32 determines whether the RSSI of the left-direction determination unit 30 is equal to or greater than the RSSI of the right-direction determination unit 29. When the RSSI of the left-direction determination unit 30 is equal to or greater than the RSSI of the right-direction determination unit 29, the process proceeds to step S24, and when the RSSI of the left-direction determination unit 30 is not equal to and not greater than the RSSI of the right-direction determination unit 29, the process proceeds to step S25. In step S23, as shown in FIG. 7, the RSSI of the left-direction determination unit 30 is compared with the RSSI of the right-direction determination unit 29 in magnitude. As an example, FIG. 7 shows a case where the RSSI of the left-direction determination unit 30 is greater than the RSSI of the right-direction determination unit 29.

In step S24, since the RSSI of the left-direction determination unit 30 is greater than the RSSI of the right-direction determination unit 29, the correction unit corrects the position estimated in step S22 with the left offset amount L1, and the process terminates. In step S25, since the RSSI of the right-direction determination unit 29 is greater than the RSSI of the left-direction determination unit 30, the correction unit corrects the position estimated in step S22 with the right offset amount L2, and the process terminates.

Figure 8:
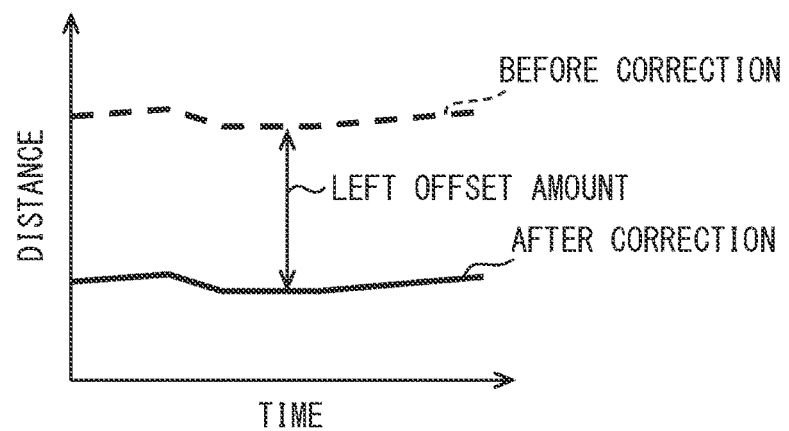
FIG. 8 is a graph illustrating a relationship between a distance and time.

FIG. 8 shows an image of correction. In FIG. 8, the distance before correction indicated by a dashed line is the distance from the distance measurement unit 31, therefore distance is corrected by the left offset amount L1 or the right offset amount L2. As an example, FIG. 8 shows a case where the RSSI of the left-direction determination unit 30 is greater than the RSSI of the right-direction determination unit 29. Therefore, in FIG. 8, the correction unit corrects the distance by subtracting the left offset amount L1 from the distance.

As described above, in the present embodiment, the left-direction determination unit 30 and the right-direction determination unit 29 determine a direction from which the radio wave transmitted by the electronic key 21 comes. The correction unit corrects the distance from the distance measurement unit 31 to the mobile terminal measured by the distance measurement unit 31 based on the direction determined by the distance measurement unit 31 and the installation position. As a result, the electronic key position estimation system is capable of measuring the distance from the edge of the vehicle 100 to the electronic key 21 regardless of the installation position of the distance measurement unit 31. The distance measurement unit 31 measures the distance based on the information other than the strength of the reception signal as a countermeasure against relay attacks. Therefore, even if the strength of the reception signal is amplified by the relay attacks, the distance measurement unit 31 is capable of maintaining a distance measurement accuracy.

In the present embodiment, it is possible to correct a distance measurement error caused by an error in the installation position of the distance measurement unit 31 in the vehicle compartment, improve the distance measuring accuracy, and allow the installation position of the antenna of the distance measurement unit 31 to be freely selected. More specifically, the distance measurement unit 31 stores the installation position in advance, and a distance measured by the distance measurement unit 31 is corrected by the installation position in a vehicle widthwise direction and a vehicle lengthwise direction. Accordingly, the distance measurement unit 31 is capable of measuring accurately the distance from the installation position to the electronic key 21 even with an omnidirectional antenna.

Further, in the present embodiment, the right-direction determination unit 29 and the left-direction determination unit 30 receive the radio wave from the electronic key 21 and determine whether the radio wave is transmitted from a right of the vehicle 100 or a left of the vehicle 100 based on the received RSSI. When the determined direction is from the right of the vehicle, the correction unit corrects the measured distance based on the right offset amount L2, and when the determined direction is from the left of the vehicle, the correction unit corrects the measured distance based on the left offset amount L1. Since the right-direction determination unit 29 and the left-direction determination unit 30 are capable of determining whether the radio wave is transmitted from the right or the left based on the RSSI, the correction unit is capable of correcting with a simple calculation.

Furthermore, in the present embodiment, the left-direction determination unit 30 and the right-direction determination unit 29 are provided on the left side of the vehicle 100 and the right side of the vehicle 100, respectively. The direction determination unit determines the direction by comparing the RSSIs output by the left-direction determination unit 30 and the right-direction determination unit 29. The direction determination unit can be realized with this simple configuration.

In the present embodiment, the distance measurement unit 31 receives the radio wave from the electronic key 21 and measures a distance from the installation position in the vehicle 100 to the electronic key 21 based on an arrival time of the radio wave from the electronic key 21. Since the arrival time is used, the distance measurement unit 31 is capable of measuring the distance with high accuracy.

Further, in the in-vehicle device 20 of the present embodiment, when the in-vehicle determination unit 28 determines that the electronic key 21 is not in the vehicle compartment, the direction determination unit, the distance measurement unit 31, and the correction unit perform the determination of the direction, the measurement of the distance, and the correction of the distance. The processing in FIG. 6 is executed when the electronic key 21 is outside the vehicle 100. Thereby, a calculation load can be reduced. In addition, the in-vehicle device 20 can deter erroneous operation.

Further, in the present embodiment, the in-vehicle receiver 27 is provided separately from the direction determination unit. However, the present embodiment is not limited to such a configuration. For example, the in-vehicle receiver 27 may determines the direction based on the RSSI detected by the in-vehicle receiver 27.

Further, in the present embodiment, the distance measurement unit 31 measures the distance based on the arrival time, or a transmission time of the radio wave, but not limited based on the arrival time. For example, the distance measurement unit 31 may measure the distance based on phase difference of the radio wave.

Second Embodiment

Figure 9:
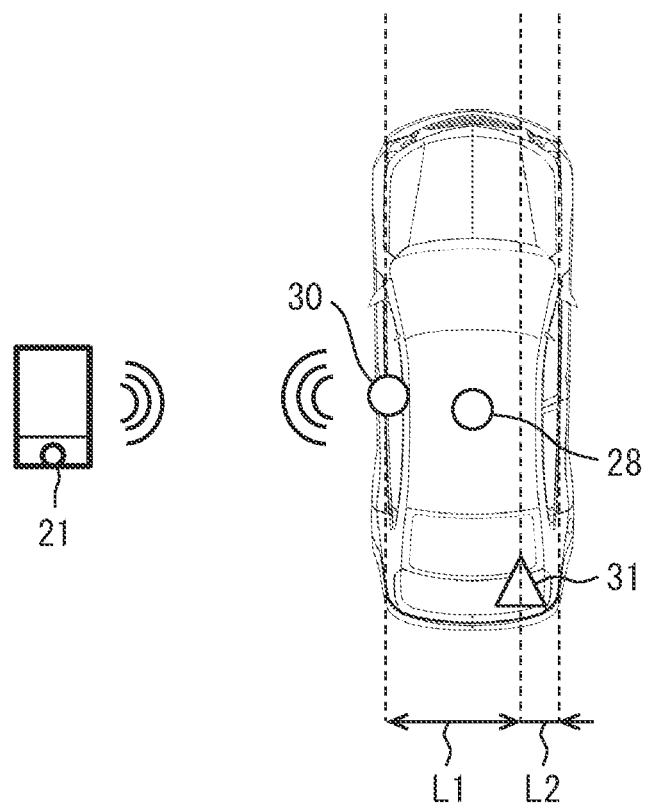
FIG. 9 is a diagram illustrating an electronic key position estimation system of a second embodiment.
Figure 10:
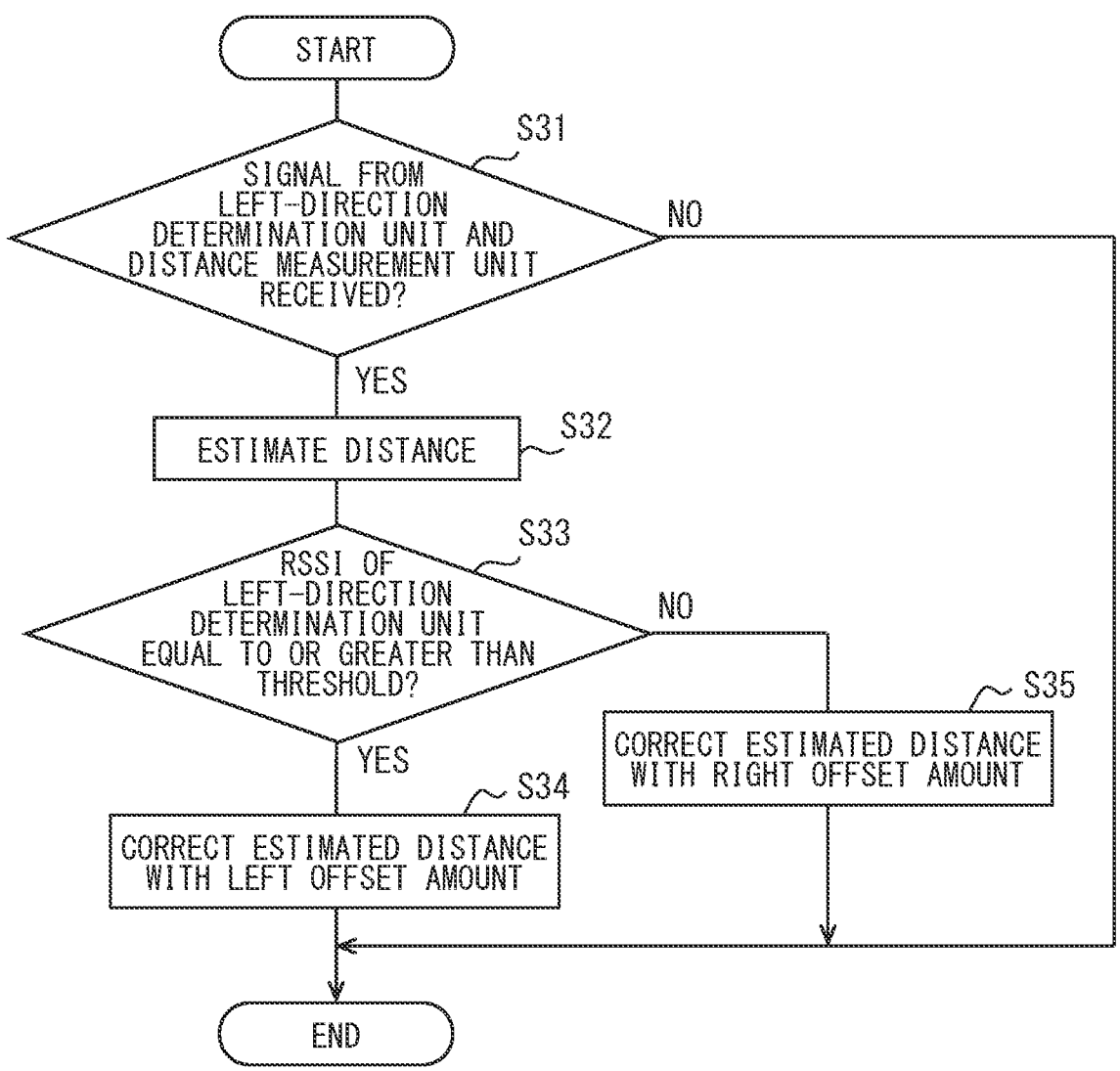
FIG. 10 is a flowchart illustrating for estimating a distance.
Figure 11:
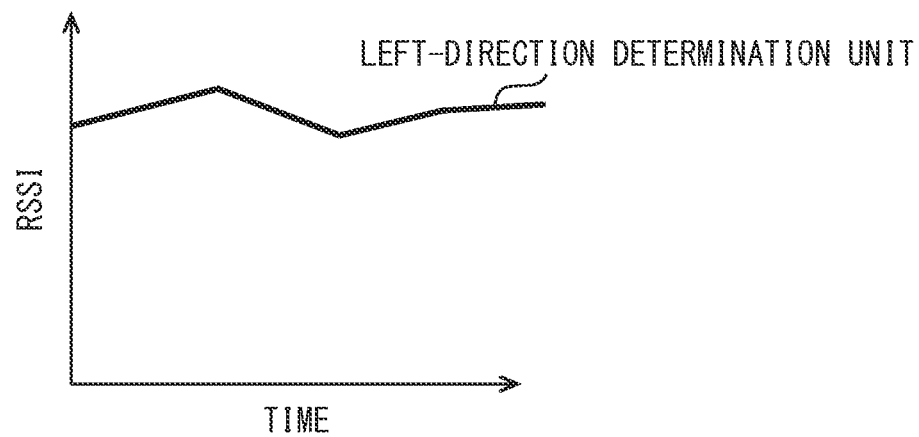
FIG. 11 is a graph illustrating a relationship between RSSI and time.

Next, a second embodiment of the present disclosure will be described with reference to FIGS. 9 to 11. As shown in FIG. 9, the second embodiment includes the left-direction determination unit 30 of the first embodiment, but does not include the right-direction determination unit 29.

Next, a processing of the present embodiment for determining the direction and correcting the distance will be described with reference to FIGS. 10 and 11. FIG. 10 is a flowchart illustrating a processing in the authentication ECU 22 related to determination of the direction. The process described in FIG. 10 is repeatedly executed in a short cycle by the authentication ECU 22. Furthermore, the processing described in FIG. 10 is executed when it is determined that the electronic key 21 is located outside the vehicle compartment in the control flow in FIG. 5. Therefore, the processing described in FIG. 10 is not executed when the electronic key 21 is in the vehicle compartment.

In step S31, it is determined whether a signal from the left-direction determination unit 30 and the distance measurement unit 31 has been received. When the signal has been received, an operation in step S32 is executed, and when the signal has not been received, the process the process terminates.

In step S32, the distance estimation unit 33 estimates the distance, and the process proceeds to step S33. In step S33, the intensity comparison unit 32 determines whether the RSSI of the left-direction determination unit 30 is equal to or greater than a threshold. When the RSSI of the left-direction determination unit 30 is equal to or greater than the threshold, the process proceeds to step S34, and when the RSSI of the left-direction determination unit 30 is not equal to and not greater than the threshold, the process proceeds to step S35. In step S33, as shown in FIG. 11, the RSSI of the left-direction determination unit 30 is compared with the threshold. The threshold is, for example, zero. When the electronic key 21 is on the left side of the vehicle 100, the left-direction determination unit 30 acquires the RSSI, but when it is not on the left side, for example, the electronic key 21 is on the right side, the left-direction determination unit 30 dose not acquire the RSSI because the vehicle 100 is an obstacle. As an example, FIG. 11 shows a case where the RSSI of the left-direction determination unit 30 acquires the RSSI.

In step S34, since the RSSI of the left-direction determination unit 30 is greater than the threshold, the correction unit corrects the position estimated in step S32 with the left offset amount L1, and the process terminates. In step S35, since the electronic key 21 is not on the left side, the electronic key 21 is determined on the right side, the correction unit corrects the position estimated in step S32 with the right offset amount L2, and the process terminates.

As described above, in the present embodiment, only the left-direction determination unit 30 determinates whether the electronic key 21 is on the right side or on the left side. Therefore, the second embodiment can be realized with a simpler configuration then the first embodiment.

Third Embodiment

Figure 13:
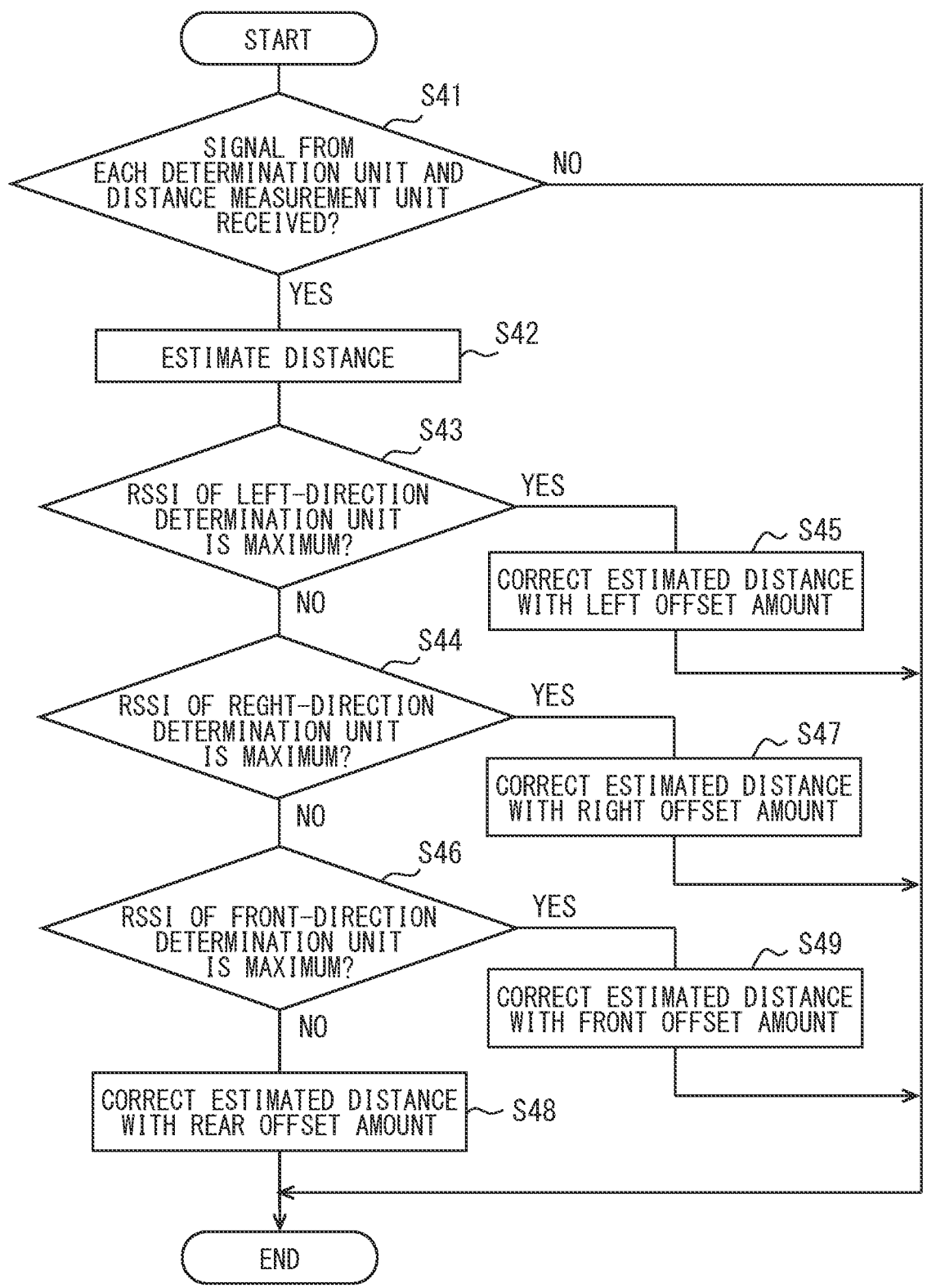
FIG. 13 is a flowchart illustrating for estimating a distance.
Figure 14:
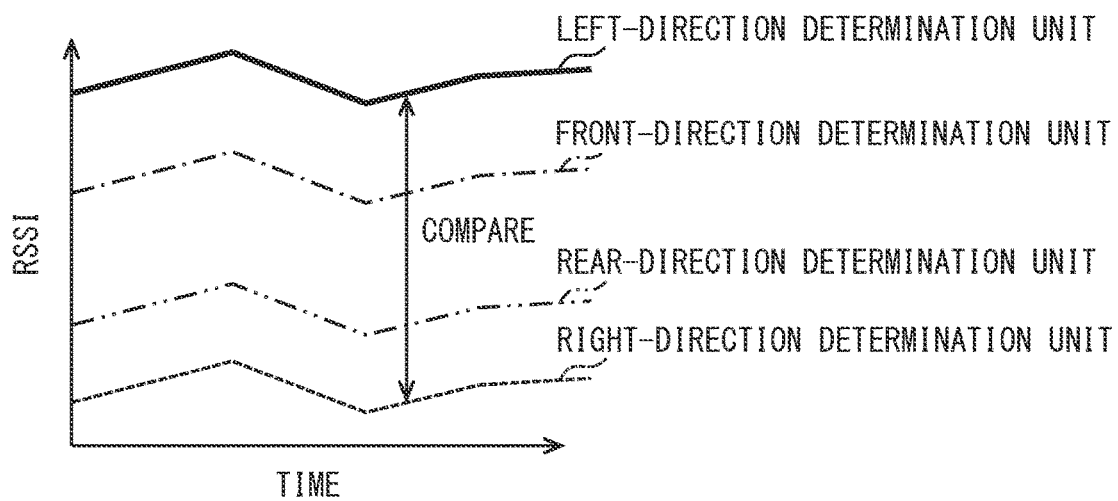
FIG. 14 is a graph illustrating a relationship between RSSI and time.

Next, a third embodiment of the present disclosure will be described with reference to FIGS. 12 to 14. The present embodiment further includes a front-direction determination unit 40 and a rear-direction determination unit 41.

The right-direction determination unit 29, the left-direction determination unit 30, the front-direction determination unit 40 and the rear-direction determination unit 41 cooperate with the authentication ECU 22, receive the radio wave from the electronic key 21 and use the RSSI of the received radio wave to determine a direction from the vehicle toward a position of the electronic key 21. Therefore, the right-direction determination unit 29 and the left-direction determination unit 30 function as a direction determination unit. More specifically, the authentication ECU 22, the right-direction determination unit 29, the left-direction determination unit 30, the front-direction determination unit 40 and the rear-direction determination unit 41 cooperate, receive the radio wave from the electronic key 21 and determine the direction based on whether the radio wave is transmitted from the right, the left, a front, or a rear of the vehicle 100 based on the RSSI received.

Figure 12:
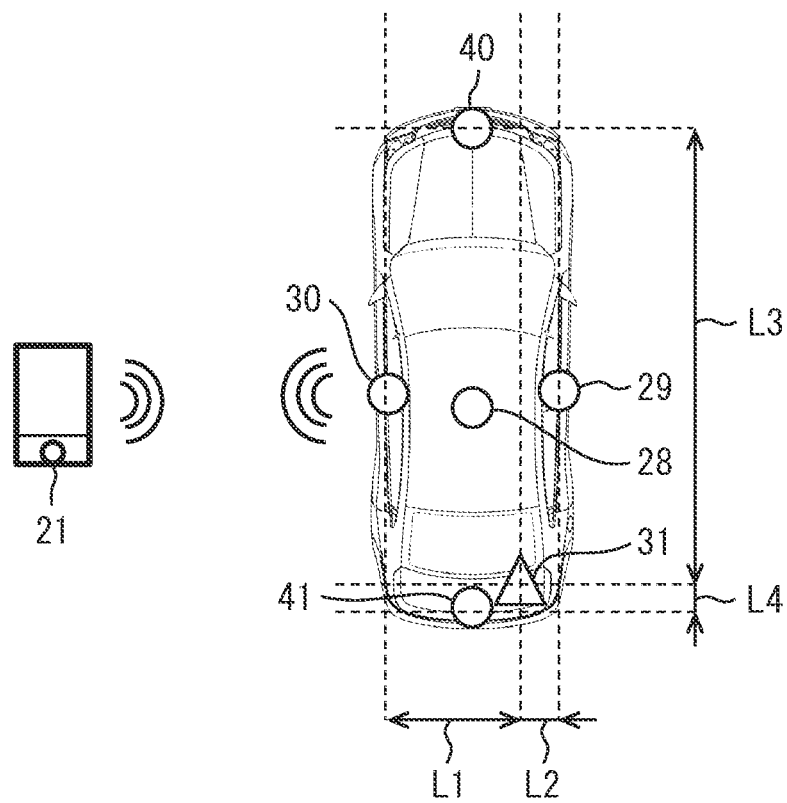
FIG. 12 is a diagram illustrating an electronic key position estimation system of a third embodiment.

As shown in FIG. 12, the front-direction determination unit 40 is provided on the front side of the vehicle 100, and the rear-direction determination unit 41 is provided on the rear side of vehicle 100. The front-direction determination unit 40 and the rear-direction determination unit 41 receive the radio wave from the electronic key 21 and output the RSSI of the received radio wave. The front-direction determination unit 40 and the rear-direction determination unit 41 have the same configuration as the right-direction determination unit 29 described above, and include a transmitter, a receiver, a calculator, and an antenna.

Information on the installation position further includes information indicating a distance L3 from a front edge of the vehicle 100 to the fourth antenna 31*d* of the distance measurement unit 31 in a front-rear direction of the vehicle 100. The distance L3 may hereinafter be referred to as a "front offset amount". Information on the installation position of the distance measurement unit 31 also includes information indicating a distance L4 from a position of a rear door handle of the vehicle 100 to the fourth antenna 31*d* of the distance measurement unit 31 in the front-rear direction. The distance L4 may hereinafter be referred to as a "rear offset amount".

When the determined direction is from the front of the vehicle, the position estimation unit 34 corrects the distance measured by the distance estimation unit 33 based on the front offset amount L3 from the front edge of the vehicle 100 to the installation position, and when the determined direction is from the rear of the vehicle, the position estimation unit 34 corrects the distance measured by the distance estimation unit 33 based on the rear offset amount L4 from the rear edge of the vehicle 100 to the installation position.

Next, a processing of the present embodiment for determining the direction and correcting the distance will be described with reference to FIGS. 13 and 14. FIG. 13 is a flowchart illustrating a processing in the authentication ECU 22 related to determination of the direction. The process described in FIG. 13 is repeatedly executed in a short cycle by the authentication ECU 22. Furthermore, the processing described in FIG. 13 is executed when it is determined that the electronic key 21 is located outside the vehicle compartment in the control flow in FIG. 5. Therefore, the processing described in FIG. 13 is not executed when the electronic key 21 is in the vehicle compartment.

In step S41, it is determined whether a signal from each direction determination unit and the distance measurement unit 31 has been received. When the signal has been received, an operation in step S42 is executed, and when the signal has not been received, the process the process terminates. Each direction determination unit is a generic term that indicates the left-direction determination unit 30, the right-direction determination unit 29, the front-direction determination unit 40 and the rear-direction determination unit 41.

In step S42, the distance estimation unit 33 estimates the distance, and the process proceeds to step S43. In step S43, the intensity comparison unit 32 determines whether the RSSI of the left-direction determination unit 30 is the maximum among four direction determination units 29, 30, 40, 41. When the RSSI of the left-direction determination unit 30 is the maximum, the process proceeds to step S45, and when the RSSI of the left-direction determination unit 30 is not the maximum, the process proceeds to step S44. In step S43, as shown in FIG. 14, the RSSIs of the four direction determination units 29, 30, 40, 41 are compared in magnitude. As an example, FIG. 14 shows a case where the RSSI of the left-direction determination unit 30 is the maximum among the four direction determination units 29, 30, 40, 41.

In step S45, since the RSSI of the left-direction determination unit 30 is the maximum among the four direction determination units 29, 30, 40, 41, the correction unit corrects the position estimated in step S42 with the left offset amount L1, and the process terminates.

In step S44, the intensity comparison unit 32 determines whether the RSSI of the right-direction determination unit 29 is the maximum among the four direction determination units 29, 30, 40, 41. When the RSSI of the right-direction determination unit 29 is the maximum, the process proceeds to step S47, and when the RSSI of the right-direction determination unit 29 is not the maximum, the process proceeds to step S46. In step S47, since the RSSI of the right-direction determination unit 29 is the maximum among the four direction determination units 29, 30, 40, 41, the correction unit corrects the position estimated in step S42 with the right offset amount L2, and the process terminates.

In step S46, the intensity comparison unit 32 determines whether the RSSI of the front-direction determination unit 40 is the maximum among the four direction determination units 29, 30, 40, 41. When the RSSI of the front-direction determination unit 40 is the maximum, the process proceeds to step S49, and when the RSSI of the front-direction determination unit 40 is not the maximum, the process proceeds to step S48. In step S49, since the RSSI of the front-direction determination unit 40 is the maximum among the four direction determination units 29, 30, 40, 41, the correction unit corrects the position estimated in step S42 with the front offset amount L3, and the process terminates.

In step S48, since the RSSI of the rear-direction determination unit 41 is the maximum among the four direction determination units 29, 30, 40, 41, the correction unit corrects the position estimated in step S42 with the rear offset amount L4, and the process terminates.

In the present embodiment, the four direction determination units 29, 30, 40, 41 are provided at intervals in a circumferential direction of the vehicle 100 in a peripheral part of the vehicle 100. Then, the RSSIs detected by the four direction determination units 29, 30, 40, 41 are compared, and the direction of the direction determination unit that detected the maximum RSSI is determined as the direction in which the electronic key 21 is located. As a result, since the direction determination unit determined the direction whether the electronic key 21 is in one of the four directions, the position estimation unit 34 is capable of estimating a position of electronic key 21 more accurately.

Fourth Embodiment

Figure 15:
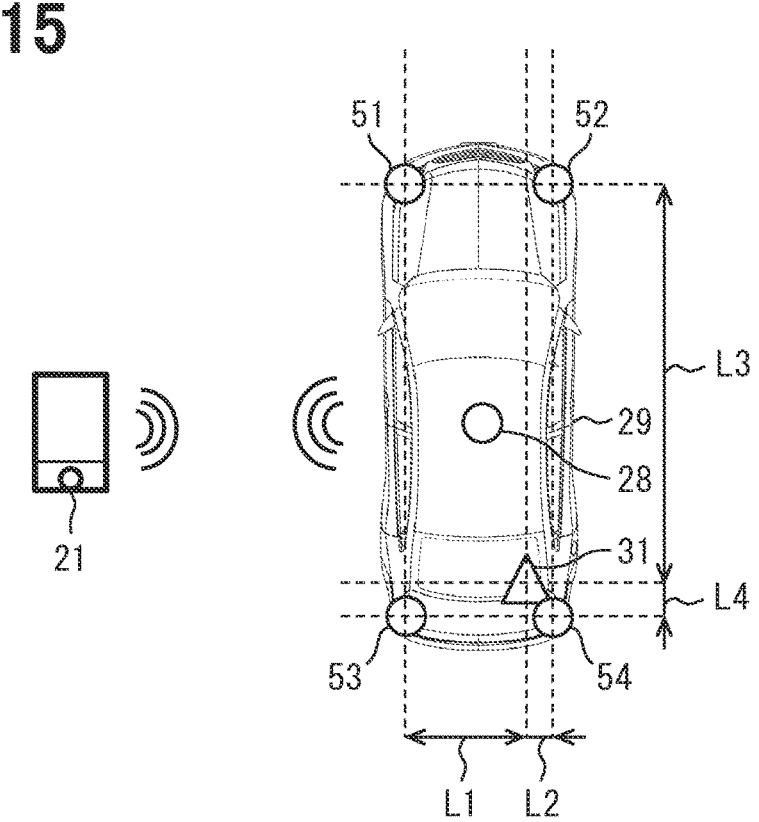
FIG. 15 is a diagram illustrating an electronic key position estimation system of a fourth embodiment.
Figure 16:
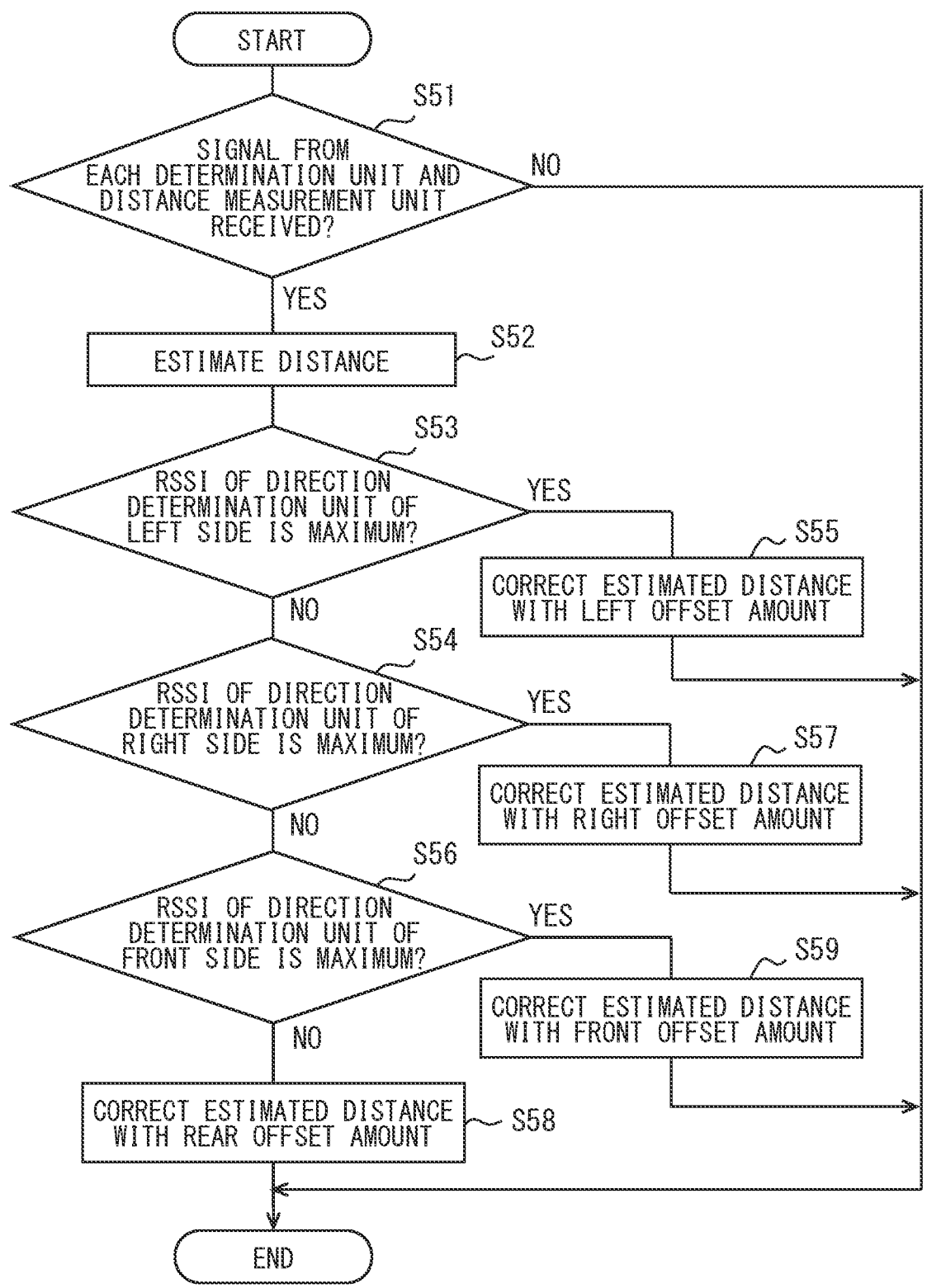
FIG. 16 is a flowchart illustrating for estimating a distance.
Figure 17:
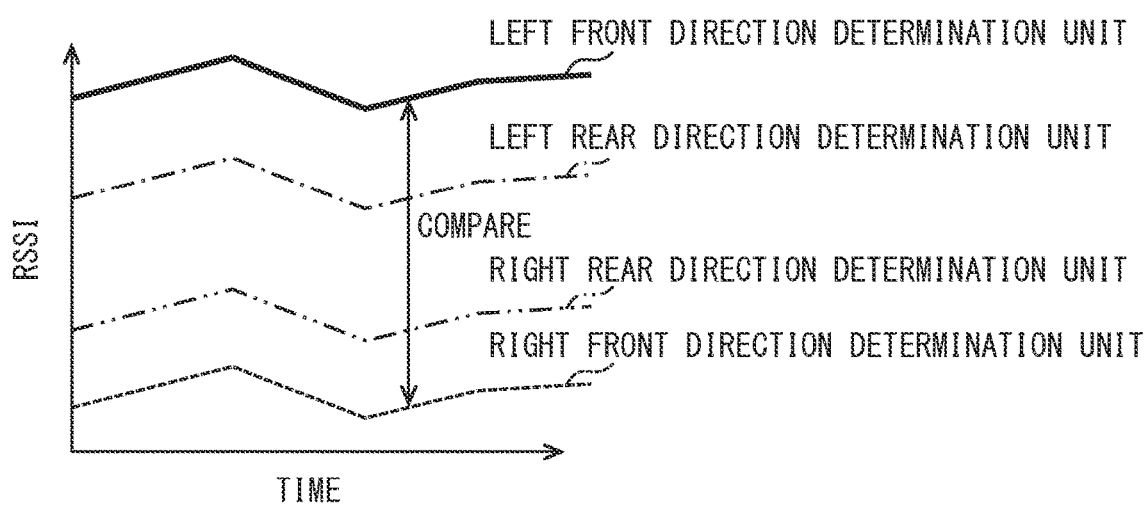
FIG. 17 is a graph illustrating a relationship between RSSI and time.

Next, a fourth embodiment of the present disclosure will be described with reference to FIGS. 15 to 17. In the present embodiment, portions of the direction determination units are different from those of the third embodiment. In the present embodiment, as shown in FIG. 15, the direction determination units are provided at four corners of the vehicle 100, or a front left, a front right, a rear left, and a rear right, respectively. Therefore, the direction determination units include a left front direction determination unit 51, a right front direction determination unit 52, a left rear direction determination unit 53, and a right rear direction determination unit 54.

The direction determination units cooperate with the authentication ECU 22, receive the radio wave from the electronic key 21 and use the RSSI of the received radio wave to determine a direction from which the radio wave transmitted by the electronic key 21 comes. More specifically, the authentication ECU 22 and the direction determination units cooperate, receive the radio wave from the electronic key 21 and determine the direction based on whether the radio wave is transmitted from the right, the left, a front, or a rear of the vehicle 100 based on the RSSI received.

The direction determination units receive the radio wave from the electronic key 21 and output the RSSI of the received radio wave. Each of the direction determination units has the same configuration as the right-direction determination unit 29 described above, and include a transmitter, a receiver, a calculator, and an antenna.

Similarly to the third embodiment described above, information on the installation position of the distance measurement unit 31 includes information indicating four offset amounts. The position estimation unit 34 corrects the distance measured by the distance estimation unit 33 based on each offset amount according to the determined direction, similarly to the third embodiment described above.

Next, a processing of the present embodiment for determining the direction and correcting the distance will be described with reference to FIGS. 16 and 17. FIG. 16 is a flowchart illustrating a processing in the authentication ECU 22 related to determination of the direction. The process described in FIG. 16 is repeatedly executed in a short cycle by the authentication ECU 22. Furthermore, the processing described in FIG. 16 is executed when it is determined that the electronic key 21 is located outside the vehicle compartment in the control flow in FIG. 5. Therefore, the processing described in FIG. 16 is not executed when the electronic key 21 is in the vehicle compartment.

In step S51, it is determined whether a signal from each direction determination unit and the distance measurement unit 31 has been received. When the signal has been received, an operation in step S52 is executed, and when the signal has not been received, the process the process terminates. Each direction determination unit is a generic term that indicates the left front direction determination unit 51, the right front direction determination unit 52, the left rear direction determination unit 53 and the right rear direction determination unit 54.

In step S52, the distance estimation unit 33 estimates the distance, and the process proceeds to step S53. In step S53, the intensity comparison unit 32 determines whether the RSSIs of the left front direction determination unit 51 and the left rear direction determination unit 53 are greater than the RSSIs of the other direction determination units. When the RSSIs of the left front direction determination unit 51 and the left rear direction determination unit 53 are greater than the RSSIs of the other direction determination units, the process proceeds to step S55, and when the RSSIs of the left front direction determination unit 51 and the left rear direction determination unit 53 are not greater than the RSSIs of the other direction determination units, the process proceeds to step S54. In step S53, as shown in FIG. 17, the RSSIs of the four direction determination units 51, 52, 53, 54 are compared in magnitude. As an example, FIG. 17 shows a case where the RSSIs of the left front direction determination unit 51 and the left rear direction determination unit 53 are greater than the RSSIs of the other direction determination units. When the direction determination unit located on the left side has a larger RSSI than the direction determination unit located on the right side, it is determined to be located on the left side.

In step S55, since the RSSIs of the direction determination unit located on the left side have a larger RSSI than the direction determination unit located on the other sides, the correction unit corrects the position estimated in step S52 with the left offset amount L1, and the process terminates.

In step S54, the intensity comparison unit 32 determines whether the RSSIs of the right front direction determination unit 52 and the right rear direction determination unit 54 are greater than the RSSIs of the other direction determination units. When the RSSIs of the right front direction determination unit 52 and the right rear direction determination unit 54 are greater than the RSSIs of the other direction determination units, the process proceeds to step S57, and when the RSSIs of the right front direction determination unit 52 and the right rear direction determination unit 54 are not greater than the RSSIs of the other direction determination units, the process proceeds to step S56. In step S57, since the RSSIs of the direction determination unit located on the right side have a larger RSSI than the direction determination unit located on the other sides, the correction unit corrects the position estimated in step S52 with the right offset amount L2, and the process terminates.

In step S56, the intensity comparison unit 32 determines whether the RSSIs of the right front direction determination unit 52 and the left front direction determination unit 51 are greater than the RSSIs of the other direction determination units. When the RSSIs of the right front direction determination unit 52 and the left front direction determination unit 51 are greater than the RSSIs of the other direction determination units, the process proceeds to step S59, and when the RSSIs of the right front direction determination unit 52 and the left front direction determination unit 51 are not greater than the RSSIs of the other direction determination units, the process proceeds to step S58. In step S59, since the RSSIs of the direction determination unit located on the front side have a larger RSSI than the direction determination unit located on the other sides, the correction unit corrects the position estimated in step S52 with the front offset amount L3, and the process terminates.

In step S58, since the RSSIs of the direction determination unit located on the rear side have a larger RSSI than the direction determination unit located on the other sides, the correction unit corrects the position estimated in step S52 with the rear offset amount L4, and the process terminates.

In the present embodiment, the direction determination units are provided at the corners in a peripheral part of the vehicle 100. Then, the RSSIs detected by the direction determination units are compared, and the direction of the direction determination unit that detected the largest RSSI and the second largest RSSI is determined as the direction in which the electronic key 21 is located. As a result, since the direction determination unit determined the direction whether the electronic key 21 is in one of the four directions, the position estimation unit 34 is capable of estimating a position of electronic key 21 more accurately.

Other Embodiments

The present disclosure is not limited to the preferred embodiments of the present disclosure described above. Various modifications may be made without departing from the subject matters of the present disclosure.

It should be understood that the configurations described in the above-described embodiments are example configurations, and the present disclosure is not limited to the foregoing descriptions. The scope of the present disclosure encompasses claims and various modifications of claims within equivalents thereof.

In the above-described first embodiment, the direction determination unit determinates whether the electronic key 21 is on the right side or on the left side. However, the first embodiment is not limited to such a configuration. The direction determination unit may determinate the direction which direction in 360 degrees. For example, the direction determination unit may transmit the radio wave having directivity, scan 360 degrees, and determinate the direction based on the response.

In the above-described third embodiment, the number of offset amounts is four, but the configuration is not limited to four. As the accuracy of the direction improves, the amount of offset in directions other than the left-right direction and the front-rear direction may be included as information and corrected based on more detailed position information.

In the third and fourth embodiments described above, the number of the direction determination unit is four in the circumferential direction, but the number is not limited to four, and may be five or more. Since the resolution improves as the number of the direction determination unit increases, the accuracy of determining the direction can be improved.

In the above-described first embodiment, the electronic key 21 is described as the mobile terminal. However, a mobile terminal having no key function can also be adopted.

In the above-described first embodiment, the in-vehicle device 20 includes the LF antenna 23 that transmits the LF wave as the antenna for transmitting the radio wave. However, the transmitted radio wave may be in a frequency band other than the LF wave. For example, the in-vehicle device 20 may include an antenna that transmits an RF wave instead of the LF antenna 23. The RF wave is sometimes called an UHF (i.e., ultrahigh frequency) wave. Specific frequencies of the RF wave include, for example, 315 Hz, 920 MHz, 2.4 GHz, and the like. Communication methods using these frequencies include, for example, Bluetooth (registered trademark).

In the above-described first embodiment, the functions realized by the authentication ECU 22 may be realized by hardware and software different from those described above or by a combination of the hardware and the software. The authentication ECU 22 may communicate with, for example, another control device, and the other control device may execute a part or all of the process. When the authentication ECU 22 is realized by an electronic circuit, the authentication ECU 22 may be realized by a digital circuit or an analog circuit, including a large number of logic circuits.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A distance estimation device estimating a distance from a mobile terminal to a vehicle, the distance estimation device comprising:
    the mobile terminal; and
    an in-vehicle device provided in the vehicle, wherein
    the mobile terminal includes:
        a terminal transmitter configured to transmit a radio wave to the vehicle; and
        a terminal controller configured to control the terminal transmitter,
    the in-vehicle device includes:
        a direction determination unit provided in the vehicle, including a receiver configured to receive the radio wave from the mobile terminal, the receiver being arranged on a side of the vehicle associated with a direction from which the radio wave transmitted by the mobile terminal comes, the direction determination unit being configured to determine the direction from which the radio wave transmitted by the mobile terminal comes based on a strength of a reception signal received by the receiver from the mobile terminal;
        a distance measurement unit configured to receive the radio wave from the mobile terminal and measure a distance from an installation position of the distance measurement unit to the mobile terminal based on an arrival time of the received radio wave from the mobile terminal; and
        a correction unit configured to correct the distance measured by the distance measurement unit,
    the direction determination unit is configured to determine the direction whether the radio wave comes from a right, a left, a rear or a front of the vehicle, and
    the correction unit is configured to correct the measured distance to be a distance from an edge of the vehicle to the mobile terminal using a distance in the direction determined by the direction determination unit from the edge of the vehicle to the installation position.

2. The distance estimation device according to claim 1, wherein
    the direction determination unit determines the direction based on whether the radio wave comes from a right of the vehicle or a left of the vehicle based on the strength of the reception signal received by the receiver,
    when the direction determined by the direction determination unit is from the right of the vehicle, the correction unit corrects the measured distance using a distance from a right edge of the vehicle to the installation position, and
    when the direction determined by the direction determination unit is from the left of the vehicle, the correction unit corrects the measured distance using a distance from a left edge of the vehicle to the installation position.

3. The distance estimation device according to claim 2, wherein
    the receiver of the direction determination unit is one of receivers provided on a left side of the vehicle and a right side of the vehicle, respectively, and configured to receive the radio wave from the mobile terminal,
    the direction determination unit includes:
        a calculator configured to calculate strengths of reception signals of the radio wave received by the receivers; and
        a determiner configured to determine the direction by comparing the strengths of the reception signals calculated by the calculator, wherein
    the determiner determines that the direction is from the right of the vehicle when a strength of a reception signal received by one of the receivers on the right side is greater than a strength of a reception signal received by one of the receivers on the left side, and the determiner determines that the direction is from the left of the vehicle when the strength of the reception signal received by the one of the receivers on the left side is greater than the strength of the reception signal received by the one of the receivers on the right side.

4. The distance estimation device according to claim 2, wherein
the receiver of the direction determination unit is one of at least four receivers provided at intervals in a circumferential direction of the vehicle in a peripheral part of the vehicle and configured to receive the radio wave from the mobile terminal,
the direction determination unit includes:
a calculator configured to calculate strengths of reception signals of the radio wave received by the at least four receivers: and
a determiner configured to determine the direction by comparing the strengths of the reception signals calculated by the calculator, wherein
the determiner determines whether the radio wave is transmitted from the right, the left, a rear or a front of the vehicle.

5. The distance estimation device according to claim 1, wherein
the in-vehicle device includes an in-vehicle determination unit provided in a vehicle compartment, configured to receive the radio wave from the mobile terminal, and configured to determine whether the mobile terminal is in the vehicle compartment based on a strength of a reception signal of the received radio wave, and
when the in-vehicle determination unit determines that the mobile terminal is not in the vehicle compartment, the direction determination unit, the distance measurement unit, and the correction unit perform the determination of the direction, the measurement of the distance, and the correction of the distance.

6. A distance estimation system comprising:
a mobile terminal configured to transmit a radio wave to a vehicle; and
an in-vehicle device provided in the vehicle, wherein
the in-vehicle device includes:
a first receiver configured to receive the radio wave from the mobile terminal, the first receiver being arranged on a side of the vehicle associated with a direction from which the radio wave transmitted by the mobile terminal comes;
a second receiver configured to receive the radio wave from the mobile terminal; and
a processor configured to:
determine the direction whether the radio wave comes from a right, a left, a rear or a front of the vehicle based on a strength of a reception signal received by the first receiver;
measure a distance from an installation position of the second receiver to the mobile terminal based on an arrival time of the received radio wave from the mobile terminal; and
estimate a distance by correcting the measured distance to be a distance from an edge of the vehicle to the mobile terminal based on a distance in the determined direction from the edge of the vehicle to the installation position of the second receiver.

* * * * *